United States Patent
Zhu et al.

(10) Patent No.: US 11,402,893 B2
(45) Date of Patent: Aug. 2, 2022

(54) LOW POWER DATA PROCESSING OFFLOAD USING EXTERNAL PLATFORM COMPONENT

(71) Applicant: Intel Corporation, Santa Clara, CA (US)

(72) Inventors: Zhenyu Zhu, Folsom, CA (US); Satheesh Chellappan, Folsom, CA (US); Mikal Hunsaker, El Dorado Hills, CA (US); Karthi R. Vadivelu, Folsom, CA (US); Kar Leong Wong, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 16/241,476

(22) Filed: Jan. 7, 2019

(65) Prior Publication Data
US 2019/0155371 A1 May 23, 2019

(51) Int. Cl.
G06F 1/3293 (2019.01)
G06F 13/42 (2006.01)
H04M 1/73 (2006.01)

(52) U.S. Cl.
CPC ........ G06F 1/3293 (2013.01); G06F 13/4282 (2013.01); H04M 1/73 (2013.01)

(58) Field of Classification Search
None
See application file for complete search history.

(56) References Cited

U.S. PATENT DOCUMENTS

| | | | |
|---|---|---|---|
| 6,594,701 B1 * | 7/2003 | Forin | G06F 12/1081 709/232 |
| 7,545,737 B2 * | 6/2009 | Engbersen | H04L 47/10 370/217 |
| 9,081,705 B2 * | 7/2015 | Paramasivam | G06F 13/102 |
| 2003/0110513 A1 * | 6/2003 | Plourde, Jr. | H04N 7/16 725/134 |
| 2004/0071171 A1 * | 4/2004 | Ghiasi | H04J 3/047 370/535 |
| 2007/0189163 A1 * | 8/2007 | Ozawa | H04L 47/10 370/230 |
| 2008/0121092 A1 * | 5/2008 | Drel | G11B 27/005 84/612 |
| 2008/0298781 A1 * | 12/2008 | Yanagihara | H04N 21/42646 386/239 |
| 2009/0055005 A1 * | 2/2009 | Oxman | G10L 19/16 700/94 |

* cited by examiner

*Primary Examiner* — Elias Mamo
(74) *Attorney, Agent, or Firm* — Schwabe, Williamson & Wyatt, P.C.

(57) ABSTRACT

Described is an apparatus comprising a first interface, a second interface, a third interface, and an interconnection fabric. The first interface may transfer a first stream of data traffic. The second interface, which may be an enhanced Serial Peripheral Interface (eSPI) interface, may transfer a second stream of data traffic and a third stream of data traffic. The third interface may transfer a fourth stream of data traffic. The interconnection fabric may couple the first interface to the second interface and may couple the second interface to the third interface. The second interface may initiate a transfer of an outbound data stream from one of the second stream of data traffic or the third stream of data traffic based on an available-space credit indicator. The second interface may receive an inbound data stream based upon the outbound data stream.

20 Claims, 6 Drawing Sheets

LOW POWER DATA PROCESSING OFFLOAD USING EXTERNAL PLATFORM COMPONENT

BACKGROUND

In markets for mobile phones, tablets, and other portable devices, there may be advantages to saving battery power for various data processing operations. For example, there may be advantages to saving battery power during audio playback while a screen is turned off. For System-on-a-Chip (SoC) implementations, this may advantageous facilitate achieving low-power Key Performance Indicators (KPIs) for low-power playback of audio streams. Such KPIs may in turn be advantageous to users listening to music with CPU in a low-power state (e.g., a package C10 state).

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
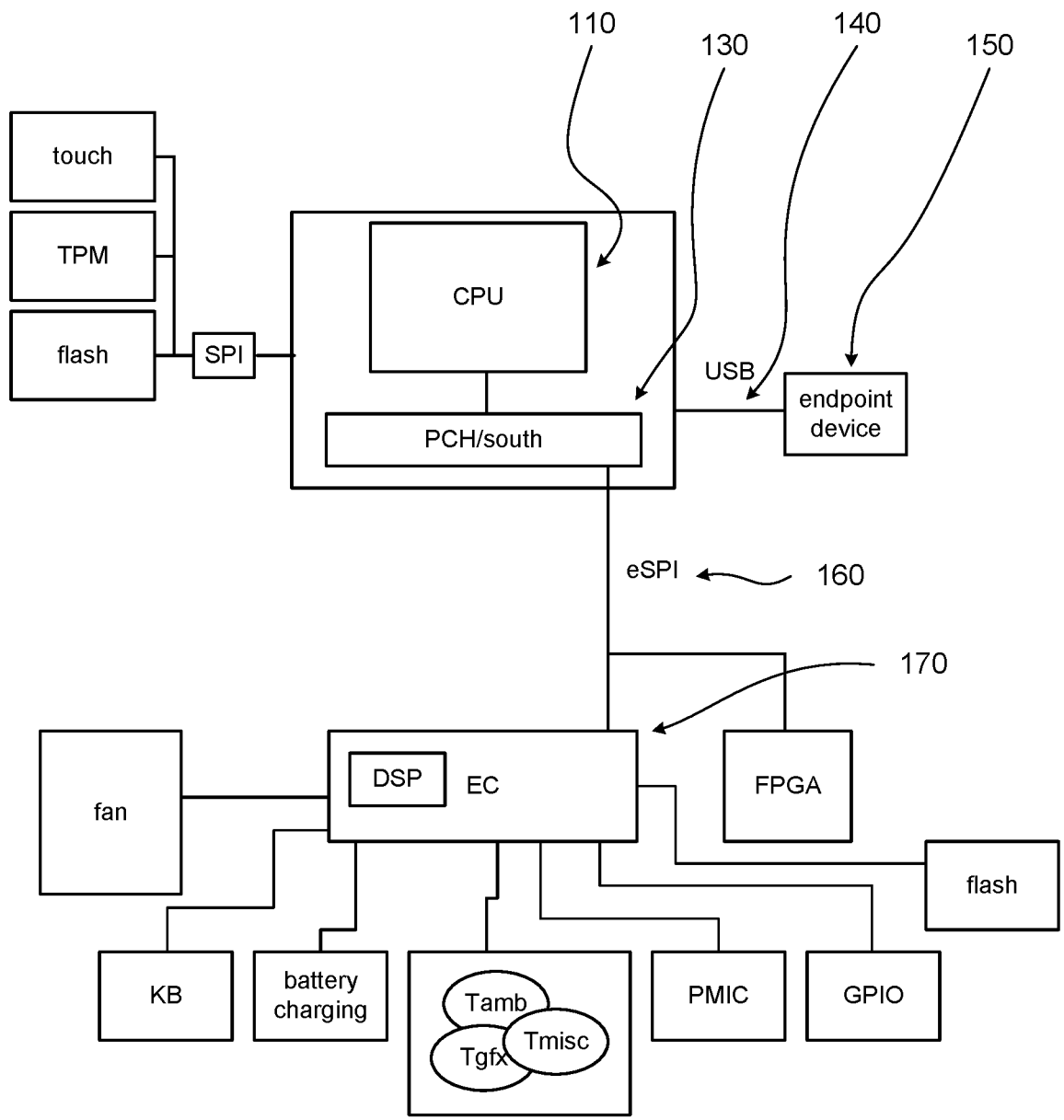
FIG. 1 illustrates an embodiment of a system comprising a Central Processing Unit (CPU), a Platform Controller Hub (PCH), and an Embedded Controller (EC) coupled to the PCH via an enhanced Serial Peripheral Interface (eSPI) interface, in accordance with some embodiments of the disclosure.

There may be advantages to saving battery power for various data processing operations, such as saving battery power during audio playback while a screen is turned off. Some platforms may include external Digital Signal Processing (DSP) elements for data processing, and may offload processing from a CPU or computing die. This may advantageously facilitate power saving by not "waking" the CPU (i.e., bringing it out of a low-power state).

Described herein are various mechanisms and methods for offloading data processing (such as audio processing) to an external component for processing (e.g., by DSP). The mechanisms and methods may facilitate significant power savings in a Central Processing Unit (CPU) and/or other components in a "north" portion of a computing system, which may in turn facilitate various applications, such as ultra-low-power audio playback. Some embodiments may pertain to offloading data (e.g., audio data and/or an audio stream) from an Endpoint (EP) device (e.g., an audio device) to an external DSP component (e.g., an audio processor), or to an EP device from an external DSP component. In some embodiments, the data may be offloaded by an eXtensible Host Controller Interface (xHCI) corresponding with a Universal Serial Bus (USB). In some embodiments, the data may be offloaded to the external DSP component via an enhanced Serial Peripheral Interface (eSPI) interface.

In comparison with offloading audio processing to internal audio processors (e.g., by utilizing deep buffers), the mechanisms and methods disclosed herein may advantageously reduce or eliminate the higher power envelope associated with waking the CPU for stream processing. For example, the mechanisms and methods disclosed herein may advantageously reduce or eliminate the higher power use associated with bringing the CPU and/or the north out of a low-power state for periodic memory access (e.g., Double Data Rate (DDR) memory access) and CPU processing of audio streams.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

With respect to various embodiments, a direct path may be provided in an xHCI controller to offload selected EPs (such as audio EPs) to an eSPI controller, which may bypass an xHCI data structure. Some embodiments may pertain to providing support for an xHCI controller to allow the detection and/or enumeration of selected devices and its EPs by a standard XHCI driver, then seamlessly hand off a stream of data traffic (e.g., audio traffic) to an external DSP (e.g., a DSP audio processor). These mechanisms and methods may advantageously use existing drivers, with minimal or no hardware changes to support a fixed circular Transfer Ring Block (TRB) for offloaded EPs.

The mechanisms and methods disclosed herein may advantageously permit low power usage. In some embodiments, power usage for USB audio streaming may be brought below, for example, 80 milliwatts (mW) of platform power (e.g., at the battery). The power delta may derive from saving power by processing on a discrete external DSP instead of a large-core SoC. Various embodiments may be compliant with standard USB and/or in-box xHCI specifications.

Some embodiments may provide a generic internal fabric protocol within the SoC transport (such as Scalable I/O (SIO)), which may be mapped to a variety of standard interface protocols (such as Advanced eXtensible Interface (AXI), Advanced Microcontroller Bus Architecture (AMBA®) High-performance Bus (AHB), Open Core Protocol (OCP), or Intel® On-chip System Fabric (IOSF). (AMBA® is a registered trademark of Arm of Cambridge, UK. Intel® is a registered trademark of Intel Corporation of Santa Clara, Calif., USA.) In some embodiments, user experiences and/or power saving for USB offload via eSPI may be comparable to accelerated High Definition Audio (HDA).

FIG. 1 illustrates an embodiment of a system comprising a CPU, a Platform Controller Hub (PCH), and an Embedded Controller (EC) coupled to the PCH via an eSPI interface, in accordance with some embodiments of the disclosure. A system 100 may have a "northern" portion (which may be referred to herein as a "north") and a "southern" portion (which may be referred to herein as a "south"). The north may comprise a CPU 110 and/or memory (e.g., Double Data Rate (DDR) memory), and the south may comprise a PCH 130. CPU 110 may be coupled to PCH 130 via an interface such as a Direct Media Interface (DMI).

In various embodiments, CPU 110 (and/or PCH 130) may be coupled through a Serial Peripheral Interface (SPI) to one or more of a touch sensor (e.g., a touch-screen), a Trusted Platform Module (TPM), and a non-volatile memory, such as a flash memory. In various embodiments, PCH 130 (and/or CPU 110) may be coupled through a USB interface 140 to an EP 150 (e.g., an audio device).

PCH 130 may also be coupled through an eSPI interface 160 to an EC 170 and/or a Field-Programmable Gate Array (FPGA). EC 170 may comprise a DSP (e.g., a DSP for audio processing). EC 170 may be coupled to one or more devices such as a fan, a keyboard (KB), a battery charging component, a temperature-measurement component (for measuring, e.g., ambient temperatures, graphics-component temperatures, and/or CPU temperatures), a Power Management Integrated Circuit (PMIC), a General-Purpose Input/Output portion (GPIO), and/or a nonvolatile memory (e.g., a flash memory).

System 100 may accordingly comprise an EC (e.g., EC 170) that may be used for system management. The EC may also have an embedded computing circuitry (such as a DSP, or a micro-controller) which may be computationally under-utilized, and which may be available for use for computationally low-intensity applications such as audio playback and/or audio capture. This may advantageously increase the value of system 100 and may save power by offloading applications related to low-power audio Key Performance Indicators (KPIs) out of power-hungry computing cores (such as CPU 110 and/or other north components). The eSPI interface may also leverage Out-of-Band (OOB) messaging with the EC in order to set up the offloading.

Figure 2:
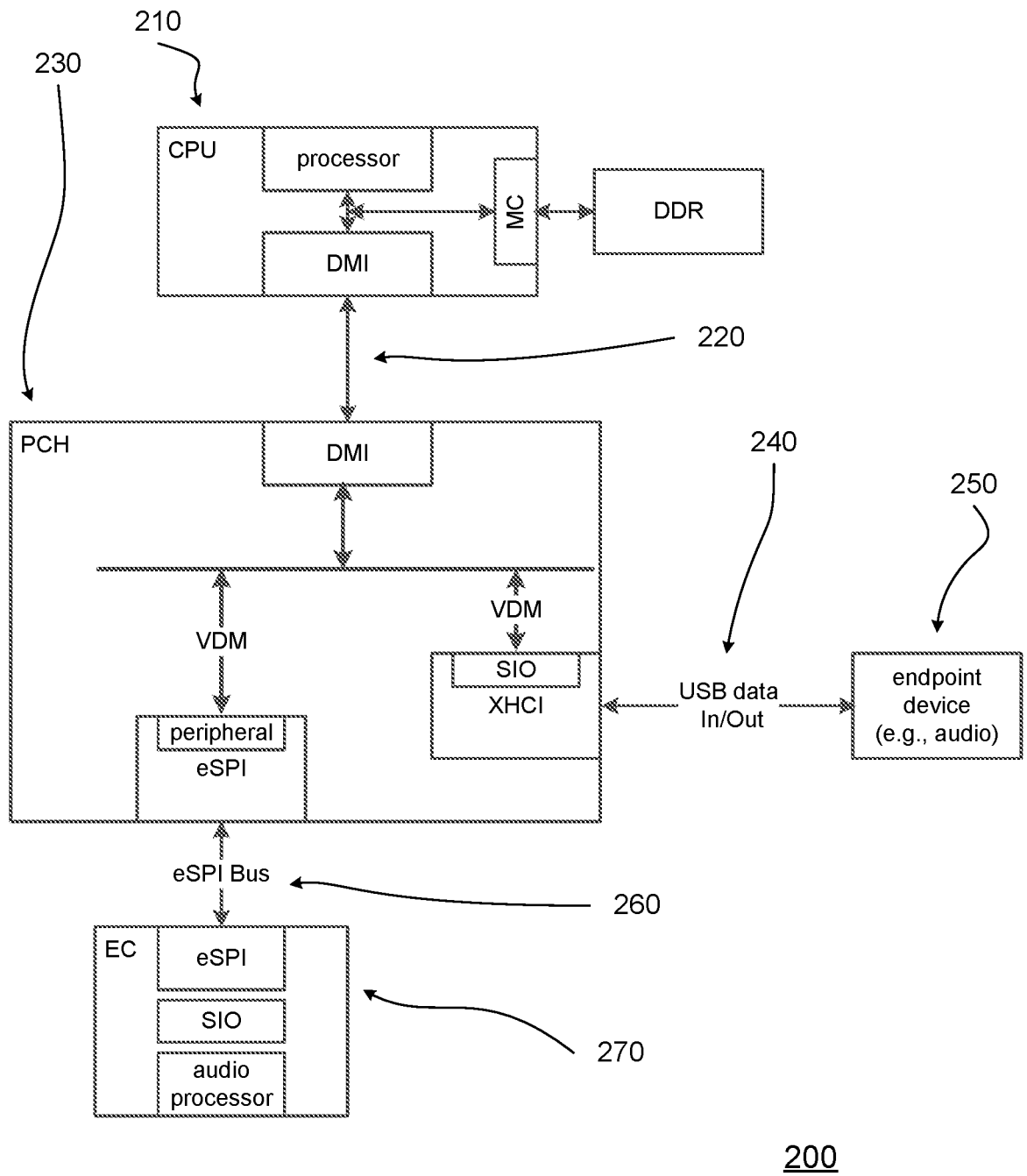
FIG. 2 illustrates a system comprising a CPU, a PCH, and an EC coupled to the PCH via an eSPI interface, in accordance with some embodiments of the disclosure.

FIG. 2 illustrates a system comprising a CPU, a PCH, and an EC coupled to the PCH via an eSPI interface, in accordance with some embodiments of the disclosure. A system 200 may have a north comprising a CPU 210 and/or a memory (e.g., a DDR memory) and a south comprising a PCH 230.

CPU 210 (which may be, or may include, a compute die) may comprise interconnected circuitries such as a processor circuitry, a memory controller (MC) circuitry, and a DMI circuitry. The MC circuitry may be coupled to the memory via a memory interface.

PCH 230 may comprise an interconnection fabric coupling a DMI circuitry, an SIO circuitry, and a peripheral circuitry. The DMI circuitry of PCH 230 may be coupled to the DMI circuitry of CPU 210 via a first interface 220 (which may be a DMI interface). The SIO circuitry of PCH 230 may be coupled to an EP device 250 (e.g., an audio device) via a second interface 240 (which may be a USB interface).

The peripheral circuitry of PCH 230 may be an eSPI circuitry, and may be coupled to an eSPI circuitry of an EC 270 via a third interface 260 (which may be an eSPI interface). Along with its eSPI circuitry, EC 270 may comprise an audio processor.

Data may flow through platform 200 in various ways. In some embodiments, some data flows may pertain to CPU 210 (e.g., a compute die) in the north and PCH 230 in the south fetching a payload (e.g., an audio payload) from memory via DMI. EC 270 may perform post processing (e.g., of an audio stream) and may pass the final audio payload at a periodic rate, which may match an isochronous service interval (SI) of an associated EP (such as an audio EP).

The path from EP device 250, through second interface 240, through third interface 260, and to the audio processor in EC 270 may have a very low latency (e.g., in some embodiments, 1 millisecond (ms), or on the order of 1 ms, or single-digit milliseconds). The path from the audio processor of EC 270, through third interface 260, through first interface 220, through the MC of CPU 210, through the memory interface, and to the memory may have a low latency (e.g., in some embodiments, 100 ms, or on the order of 100 ms, or hundreds of milliseconds). The path from the memory, through the memory interface, through the MC of CPU 210, and to the processor circuitry of CPU 210 may have a relatively higher latency (e.g., in some embodiments, 1 second, or on the order of 1 second, or single-digit seconds).

In some embodiments, some or all of the computation for post-processing of EP data (e.g., audio data) may be done in EC 270, which may advantageously keep part or all of CPU 210 in a low-power state (e.g., a package C10 state) and may thereby save power.

Various flows of operation may have several aspects, such as a first aspect pertaining to device attach. When EP device 250 is attached to a port of system 200 (e.g., when a USB audio device is attached to a USB port of system 200), or when EP device 250 is an onboard USB Bluetooth controller (which may be soldered down on a motherboard), the device attach detect and enumeration may be handled by an xHCI host driver. A portion of the driver may interface with an in-box driver through a standard API to negotiate an offloading decision of EP device 250. After EP device 250 is enumerated and/or a device configuration for EP device 250 is complete, a compatibility of EP device 250 may be checked before deciding to hand over ownership to an eSPI audio offload function.

In some embodiments, an additional capability available at a software level may be an ability to filter a selected set of audio device vendor makes and/or models for eSPI audio offload. Once EP device 250 is offloaded, the standard device might not maintain the data path and EP context. The driver may then set up the xHCI controller to register an associated slot and/or EP number that is offloaded, one or more EP attributes, and so on.

A second aspect of various flows of operation may pertain to stream formats. When software makes a decision to offload EP device 250, it may check a corresponding EP configuration to match the configuration of the audio stream format. The configuration may comprise parameters such as an SI (e.g., 1 ms, 500 microseconds (us), 250 us, or 125 us), a stream frame rate (e.g., 44.1 kilohertz (KHz) or 48 KHz), a number of channels (e.g., 2 channels, which may correspond with stereo playback), and so on. The scheduling of corresponding isochronous traffic may be managed by the xHCI controller. A stream payload may be sent to eSPI (or received from eSPI) through peer-to-peer communication. In some embodiments, there might be no Direct Memory Access (DMA) access to memory (e.g., to DDR).

A third aspect of various flows of operation may pertain to eSPI DMA for, e.g., audio payloads. Using an audio-playback example, an actual audio file (e.g., an MP3) may be stored in a "far" memory (such as a Hard Disk Drive (HDD) or a Solid-State Drive (SSD)). Based on the audio format, the system may be disposed toward audio processing in the north (e.g., at CPU 210) at a longer periodicity, such as a 1-second interval or a 2-second interval. The processed payload may be stored in the memory (e.g., DDR) for eSPI to fetch (e.g., via DMA), and store in deep buffers in EC 270. This may advantageously provide a low-periodicity payload fetch path providing a race-to-halt for the memory and the data path, which may facilitate power gating and/or putting the memory in self-refresh.

A fourth aspect of various flows of operation may pertain to bypassing CPU processing. In some embodiments, most or all of the computation for audio post-processing may be done in EC 270, keeping part or all of CPU 210 in a low-power state (e.g., package C10) and saving additional power. Some low-end audio stream formats may either be processed ahead of time, or bypass part or all CPU processing so that minimal processing may be done at EC 270 (e.g., at an external DSP processor).

A fifth aspect of various flows of operation may pertain to xHCI handling. An xHCI hardware controller may be disposed to being updated to support a fixed internal circular TRB structure and register attributes to differentiate the selected EP for offloading, based on the slot and EP number. Systems may be disposed to exposing one or more capability registers for software to discover feature availability and make an offload decision. Systems may also be disposed to having special register attributes to control and configure starting, stopping, and error handling of an offloaded EP. Systems may be disposed to providing support for one or more watchdog timers to facilitate detection of error conditions (e.g., error conditions on a per audio stream basis). Various embodiments may be transparent to USB link layers and/or the remote device (e.g., EP device 250).

A sixth aspect of various flows of operation may pertain to eSPI support. An eSPI hardware controller may comprise at least a minimum level of support to expose a peer-to-peer interface, either through SIO or a Virtual Channel (VC). If the design is using an SIO method, then eSPI may be disposed to using an SIO layer for pin multiplexing and/or credit handling; otherwise, if the SoC decides to use a VC, then a dedicated channel and queue may be used for a peer-to-peer path, using Vendor Defined Messages (VDMs). DMA support to fetch a payload from memory (e.g., DDR) and an EC interface may be supported by eSPI.

Figure 3:
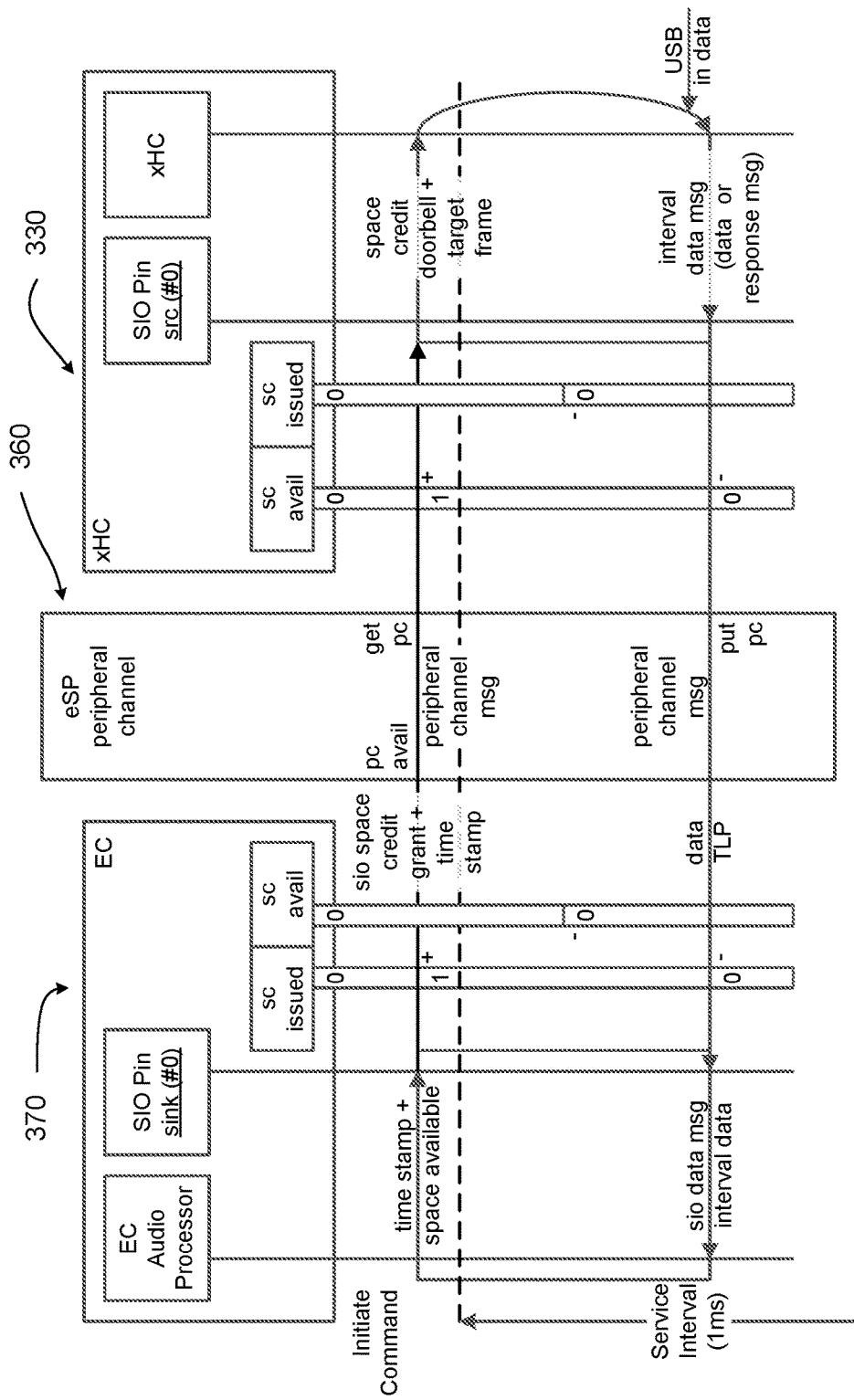
FIG. 3 illustrates portions of a PCH and an EC coupled via an eSPI interface, in accordance with some embodiments of the disclosure.

FIG. 3 illustrates portions of a PCH and an EC coupled via an eSPI interface, in accordance with some embodiments of the disclosure. A system 300 may comprise an eXtensible Host Controller (xHC) circuitry 330, an EC 370, and an interface 360. In some embodiments, xHC circuitry 330 may be part of, or may comprise, a PCH. In various embodiments, interface 360 may be an eSPI interface.

In system 300, a data sequence may use SIO transport for an audio capture stream. For example, after a microphone device is enumerated and offloaded, an xHCI may prepare one or more local TRB rings to get isochronous input data from the microphone device (which may be a USB device).

An external DSP processor may be an SIO agent, and may be a communication-peer with an xHCI agent. For capture streams, input data may be passed from xHC 330 to EC 370 via interface 360, and EC 370 may be disposed to ensuring that it has exposed at least two space-available credits. This may advantageously facilitate or eliminate overflow prevention in the xHCI.

The capture audio stream may be sent from the microphone device at a periodic SI (which may be, e.g., 1 ms for a typical USB 2.0 device). Since there might be no deep buffer in SPI, capture-payload VDMs may be passed immediately to EC 370. EC 370 may then process the payload. EC 370 may also ensure that the credits are replenished, and there are at least two outstanding credits available at all times.

Based on frame rates and sizes, a payload size may be one or more USB isochronous packet sizes. The USB packets may be broken down to SIO transaction sizes before being sent to EC 370 via interface 360. The design may optionally expose the SIO transaction packets or the whole interval as units of space credits.

For captured streams, the first stage of Wake on Voice (WoV) may be processed in EC 370, so a CPU and/or north (which may include a memory, such as DDR) might not become involved. On an indication of voice or speech activity detection, a payload may be pushed into the memory by EC 370 via eSPI DMA (e.g., for a second stage of voice and speech processing).

Capturing streams may advantageously be done with less power, since the CPU and memory might not be involved in idle scenarios and/or quiet scenarios. For playback of an audio stream with limited post processing, the CPU may be completely set aside, and only a memory path might be involved in a payload acquisition phase (which may happen in some embodiments, for example, at a periodicity of hundreds of ms).

Figure 4:
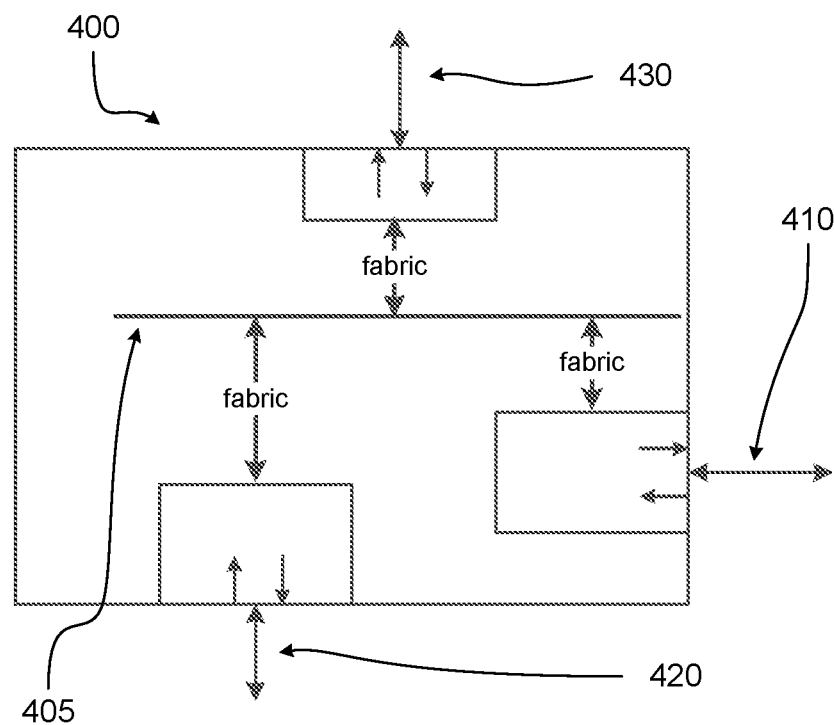
FIG. 4 illustrates a component comprising interfaces for coupling with a CPU, an external Endpoint (EP) device, and an EC, in accordance with some embodiments of the disclosure.

FIG. 4 illustrates a component comprising interfaces for coupling with a CPU, an external EP device, and an EC, in accordance with some embodiments of the disclosure. A component 410 may comprise a first bi-directional interface 410, a second bi-directional interface 420, and a third bi-directional interface 430, as well as an interconnection fabric 405 interconnecting the three bi-directional interfaces. Portions of component 400 may correspond with portions of PCH 130, portions of PCH 230, and/or portions of xHC 330.

Each of first bi-directional interface 410, second bi-directional interface 420, and third bi-directional interface 430 may have an inbound interface and an outbound interface, which may be physical interfaces and/or logical interfaces.

In some embodiments, in a first direction of audio stream flow, audio capture from an EP may be offloaded. An audio stream may be transferred from first bi-directional interface 410, through its inbound interface, to interconnection fabric 405. The audio stream may then be transferred from interconnection fabric 405 to second bi-directional interface 420, through its outbound interface. The audio stream may then be processed (e.g., in an EC). Subsequently, the audio stream may be transferred from second bi-directional interface 420, through its inbound interface, to interconnection fabric 405. The audio stream may then be transferred from interconnect fabric 405 to third bi-directional interface 430, through its outbound interface.

Accordingly, in embodiments in which audio capture from an EP is offloaded, the first interface (which may be a bi-directional interface and may correspond with USB interface 140, second interface 240, and or first bi-directional interface 410) may transfer the first stream of data traffic from a USB bus to an interconnection fabric, the second interface (which may be a bi-directional interface and may correspond with eSPI interface 160, third interface 260, interface 360, and/or second bi-directional interface 420) may transfer the second stream of data traffic from the interconnection fabric to an eSPI bus. The second interface may then transfer the third stream of data traffic from the eSPI bus to the interconnection fabric, and the third interface (which may be a bi-directional interface and may correspond with first interface 220 and/or third bi-directional interface 430) may transfer the fourth stream of data traffic from the interconnection fabric to a bus for a DMI interface.

In some embodiments, in a second direction of audio stream flow, audio playback to an EP may be offloaded. An audio stream may be transferred from third bi-directional interface 430, through its inbound interface, to interconnection fabric 405. The audio stream may then be transferred from interconnection fabric 405 to second bi-directional interface 420, through its outbound interface. The audio stream may then be processed (e.g., in an EC). Subsequently, the audio stream may be transferred from second bi-directional interface 420, through its inbound interface, to interconnection fabric 405. The audio stream may then be transferred from interconnect fabric 405 to first bi-directional interface 430, through its outbound interface.

Accordingly, in embodiments in which audio playback to an EP is offloaded, the first interface (which may be a bi-directional interface and may correspond with first interface 220 and/or third bi-directional interface 430) may transfer the first stream of data traffic from a bus for a DMI interface to an interconnection fabric, the second interface (which may be a bi-directional interface and may correspond with eSPI interface 160, third interface 260, interface 360, and/or second bi-directional interface 420) may transfer the second stream of data traffic from the interconnection fabric to an eSPI bus. The second interface may then transfer the third stream of data traffic from the eSPI bus to the interconnection fabric, and the third interface (which may be a bi-directional interface and may correspond with USB interface 140, second interface 240, and or first bi-directional interface 410) may transfer the fourth stream of data traffic from the interconnection fabric to a USB bus.

With respect to various embodiments, an apparatus for supporting either the first direction of audio stream flow or the second direction of audio stream flow may comprise a first interface, a second interface, and a third interface. The first interface may transfer a first stream of data traffic. The second interface (which may be an eSPI interface) may transfer a second stream of data traffic and may transfer a third stream of data traffic. The third interface may transfer a fourth stream of data traffic. The interconnection fabric may couple the first interface to the second interface and may couple the second interface to the third interface. The second interface may initiate a transfer of an outbound data stream from one of the second stream of data traffic or the third stream of data traffic based on an available-space credit indicator, and the second interface may receive an inbound data stream based upon the outbound data stream.

In some embodiments, the first stream of data traffic may be an input stream of data traffic, the second stream of data traffic may be an output stream of data traffic, and the interconnection fabric may transfer the first stream of data traffic to the second stream of data traffic. In some embodiments, the third stream of data traffic may be an input stream of data traffic, the fourth stream of data traffic may be an output stream of data traffic, and the interconnection fabric may transfer the third stream of data traffic to the fourth stream of data traffic. For some embodiments, an SI of the second input stream may be substantially the same as an SI of the first input stream.

For some embodiments, the fourth stream of data traffic may be an input stream of data traffic, the third stream of data traffic may be an output stream of data traffic, and the interconnection fabric may transfer the fourth stream of data traffic to the third stream of data traffic. For some embodiments, the second stream of data traffic may be an input stream of data traffic, the first stream of data traffic may be an output stream of data traffic, and the interconnection fabric may transfer the second stream of data traffic to the first stream of data traffic.

In some embodiments, the first interface may be an xHCI interface. For some embodiments, at least one of the first stream of data traffic, the second stream of data traffic, the third stream of data traffic, and the fourth stream of data traffic may comprise a stream of audio data.

In some embodiments, the apparatus may comprise a register for indicating the capability of data EP offload. For some embodiments, the apparatus may comprise a register for indicating a start of an EP offload and/or a register for indicating a stop of an EP offload.

With respect to various embodiments, an apparatus for supporting either the first direction of audio stream flow or the second direction of audio stream flow may comprise a first interface, a second interface, and a third interface. The first interface may transfer a first stream of data traffic. The second interface (which may be an eSPI interface) may transfer a second stream of data traffic and a third stream of data traffic. The third interface may transfer a fourth stream of data traffic. The first interface may be coupled to the second interface, and may transfer data traffic between the first stream of data traffic and the second stream of data traffic. The second interface may be coupled to the third interface, and may transfer data traffic between the third stream of data traffic and the fourth stream of data traffic. The second interface may initiate transmission of an outbound data stream from one of the second stream of data traffic or the third stream of data traffic based on an available-space credit indicator, and the second interface may receive an inbound data stream based upon the outbound data stream.

In some embodiments, an interconnect fabric may couple the first interface to the second interface, and may couple the second interface to the third interface. For some embodiments, the first interface may be an xHCI interface. In some embodiments, at least one of the first stream of data traffic, the second stream of data traffic, the third stream of data traffic, and the fourth stream of data traffic may comprise a stream of audio data.

In some embodiments, the first stream of data traffic may be an input stream of data traffic, the second stream of data traffic may be an output stream of data traffic, and the first stream of data traffic may be transferred to the second stream of data traffic. In some embodiments, the third stream of data traffic may be an input stream of data traffic, the fourth stream of data traffic may be an output stream of data traffic, and the third stream of data traffic may be transferred to the fourth stream of data traffic. For some embodiments, an SI of the second input stream may be substantially the same as an SI of the first input stream.

For some embodiments, the fourth stream of data traffic may be an input stream of data traffic, the third stream of data traffic may be an output stream of data traffic, and the interconnection fabric may transfer the fourth stream of data traffic to the third stream of data traffic. For some embodiments, the second stream of data traffic may be an input stream of data traffic, the first stream of data traffic may be an output stream of data traffic, and the interconnection fabric may transfer the second stream of data traffic to the first stream of data traffic.

In some embodiments, the apparatus may comprise a register for indicating the capability of data EP offload, a register for indicating a start of an EP offload, and/or a register for indicating a stop of an EP offload.

With respect to various embodiments, a system for supporting either the first direction of audio stream flow or the second direction of audio stream flow may comprise a memory, a processor coupled to the memory, a wireless interface for allowing the processor to communicate with another device, and a component including a first interface, a second interface, and a third interface. The first interface may handle a first stream of data traffic. The second interface (which may be may an eSPI interface) may handle a second stream of data traffic and a third stream of data traffic. The third interface may handle a fourth stream of data traffic. An interconnection fabric may couple the first interface to the second interface and may couple the second interface to the third interface. The second interface may initiate a transfer of an outbound data stream from one of the second stream of data traffic or the third stream of data traffic based on an available-space credit indicator, and the second interface may receive an inbound data stream based upon the outbound data stream.

In some embodiments, the first interface may be an xHCI interface. For some embodiments, at least one of the first stream of data traffic, the second stream of data traffic, the third stream of data traffic, and the fourth stream of data traffic may comprise a stream of audio data.

In some embodiments, the first stream of data traffic may be an input stream of data traffic, the second stream of data traffic may be an output stream of data traffic, and the interconnection fabric may transfer the first stream of data traffic to the second stream of data traffic. In some embodiments, the third stream of data traffic may be an input stream of data traffic, the fourth stream of data traffic may be an output stream of data traffic, and the interconnection fabric may transfer the third stream of data traffic to the fourth stream of data traffic.

For some embodiments, the fourth stream of data traffic may be an input stream of data traffic, the third stream of data traffic may be an output stream of data traffic, and the interconnection fabric may transfer the fourth stream of data traffic to the third stream of data traffic. For some embodiments, the second stream of data traffic may be an input stream of data traffic, the first stream of data traffic may be an output stream of data traffic, and the interconnection fabric may transfer the second stream of data traffic to the first stream of data traffic.

With respect to various embodiments, a method for supporting either the first direction of audio stream flow or the second direction of audio stream flow may comprise a first transferring, a second transferring, an initiating, and a receiving. In the first transferring, data traffic may be transferred between a first stream of data traffic corresponding with a first interface and a second stream of data traffic corresponding with a second interface. In the second transferring, data traffic may be transferred between a third stream of data traffic corresponding with the second interface and a fourth stream of data traffic corresponding with a third interface. In the initiating, a transfer of an outbound data stream through the second interface based upon an available-space credit indicator of the second interface may be initiated, the outbound data stream being transferred from one of the second stream of data traffic or the third stream of data traffic. In the receiving, an inbound data stream may be received through the second interface, the inbound data stream being based upon a processing of the outbound data stream.

In some embodiments, the first interface may be an xHCI interface. IN some embodiments, at least one of the first stream of data traffic, the second stream of data traffic, the third stream of data traffic, and the fourth stream of data traffic may comprise a stream of audio data.

In some embodiments, the first stream of data traffic may be an input stream of data traffic, the second stream of data traffic may be output stream of data traffic, and an interconnection fabric may transfer the first stream of data traffic to the second stream of data traffic. In some embodiments, the third stream of data traffic may be an input stream of data traffic, the fourth stream of data traffic may be an output stream of data traffic, and the interconnection fabric may transfer the third stream of data traffic to the fourth stream of data traffic.

For some embodiments, the fourth stream of data traffic may be an input stream of data traffic, the third stream of data traffic may be an output stream of data traffic, and an interconnection fabric may transfer the fourth stream of data traffic to the third stream of data traffic. For some embodiments, the second stream of data traffic may be an input stream of data traffic, the first stream of data traffic may be an output stream of data traffic, and the interconnection fabric may transfer the second stream of data traffic to the first stream of data traffic.

Figure 5:
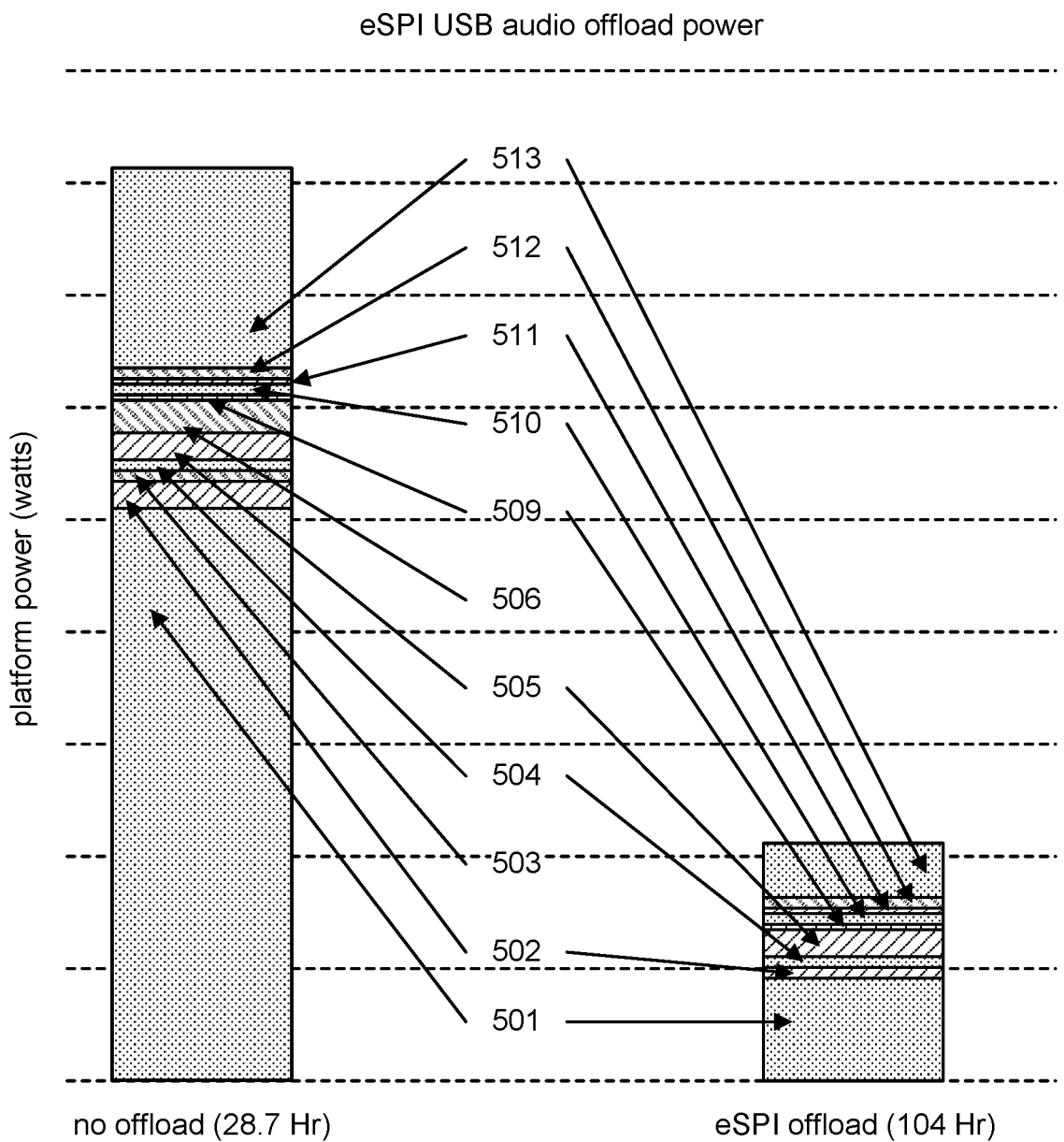
FIG. 5 illustrates a high-level power analysis, in accordance with some embodiments of the disclosure.

FIG. 5 illustrates a high-level power analysis, in accordance with some embodiments of the disclosure. A power usage for a no-offload case and a power usage for an eSPI-offload case may comprise various parts, such as an SoC part 501, a memory part 502, a WiFi® part 503, a storage part 504, a USB part 505, an audio part 506, a Bluetooth® part 509, a 3rd Generation Partnership Project (3GPP) and/or 3GPP Long-Term Evolution (LTE) part 510, a WiGig® part 511, a voltage regulator loss and gate-bounce part 513, a panel part 514, and a part for other power usage 512. (Wi-Fi® is a registered trademark of the Wi-Fi Alliance of Austin, Tex., USA. Bluetooth® is a registered trademark of the Bluetooth Special Interest Group of Kirkland, Wash., USA. WiGig® is a registered trademark of the Wi-Fi Alliance of Austin, Tex., USA.)

According to the analysis, the no-offload case (which may correspond to traditional USB audio streaming) may consume about four times as much power as the eSPI-offload case.

Although the actions with reference to the methods discussed herein are presented in a particular order, the order of the actions can be modified. Thus, the actions can be performed in a different order, and some actions may be performed in parallel. Some of the actions and/or operations discussed are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods discussed herein.

Moreover, in some embodiments, machine readable storage media may have executable instructions that, when executed, cause one or more processors to perform an operation comprising a method as discussed herein. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 6:
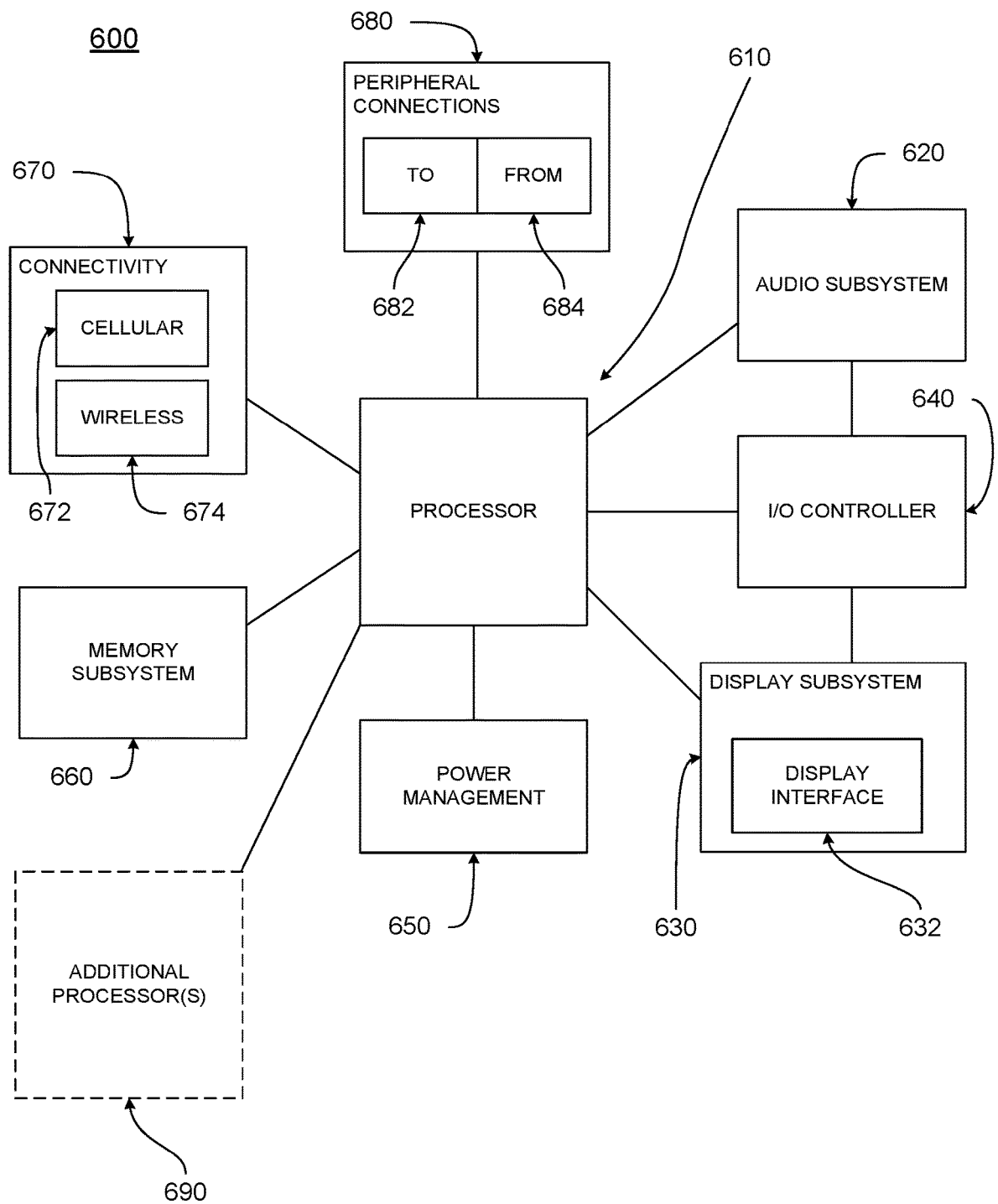
FIG. 6 illustrates a computing device with a CPU, a PCH, and an EC coupled to the PCH, in accordance with some embodiments of the disclosure.

FIG. 6 illustrates a computing device with a CPU, a PCH, and an EC coupled to the PCH, in accordance with some embodiments of the disclosure. Computing device 600 may be a computer system, a System-on-a-Chip (SoC), a tablet, a mobile device, a smart device, or a smart phone with a CPU, a PCH, and an EC coupled to the PCH, in accordance with some embodiments of the disclosure. It will be understood that certain components of computing device 600 are shown generally, and not all components of such a device are shown FIG. 6. Moreover, while some of the components may be physically separate, others may be integrated within the same physical package, or even on the same physical silicon die. Accordingly, the separation between the various components as depicted in FIG. 6 may not be physical in some cases, but may instead be a functional separation. It is also pointed out that those elements of FIG. 6 having the same names or reference numbers as the elements of any other figure can operate or function in any manner similar to that described, but are not limited to such.

In various embodiments, the components of computing device 600 may include any of a processor 610, an audio subsystem 620, a display subsystem 630, an I/O controller 640, a power management component 650, a memory subsystem 660, a connectivity component 670, one or more peripheral connections 680, and one or more additional processors 690. In some embodiments, processor 610 may include a CPU, a PCH, and an EC coupled to the PCH, in accordance with some embodiments of the disclosure. In various embodiments, however, any of the components of computing device 600 may include the CPU, the PCH, and the EC coupled to the PCH, in accordance with some embodiments of the disclosure. In addition, one or more components of computing device 600 may include an interconnect fabric having a plurality of ports, such as a router, a network of routers, or a Network-on-a-Chip (NoC).

In various embodiments, processor 610 may comprise a CPU, and one or more components of computing device 600 may comprise the PCH and the EC coupled to the PCH.

In some embodiments, computing device 600 may be a mobile device which may be operable to use flat surface interface connectors. In one embodiment, computing device 600 may be a mobile computing device, such as a computing tablet, a mobile phone or smart-phone, a wireless-enabled e-reader, or other wireless mobile device. The various embodiments of the present disclosure may also comprise a network interface within 670 such as a wireless interface so that a system embodiment may be incorporated into a wireless device, for example a cell phone or personal digital assistant.

Processor 610 may be a general-purpose processor or CPU (Central Processing Unit). In some embodiments, processor 610 may include one or more physical devices, such as microprocessors, application processors, microcontrollers, programmable logic devices, or other processing means. The processing operations performed by processor 610 may include the execution of an operating platform or operating system on which applications and/or device functions may then be executed. The processing operations may also include operations related to one or more of the following: audio I/O; display I/O; power management; connecting computing device 600 to another device; and/or I/O (input/output) with a human user or with other devices.

Audio subsystem 620 may include hardware components (e.g., audio hardware and audio circuits) and software components (e.g., drivers and/or codecs) associated with providing audio functions to computing device 600. Audio functions can include speaker and/or headphone output as well as microphone input. Devices for such functions can be integrated into computing device 600, or connected to computing device 600. In one embodiment, a user interacts with computing device 600 by providing audio commands that are received and processed by processor 610.

Display subsystem 630 may include hardware components (e.g., display devices) and software components (e.g., drivers) that provide a visual and/or tactile display for a user to interact with computing device 600. Display subsystem 630 may include a display interface 632, which may be a particular screen or hardware device used to provide a display to a user. In one embodiment, display interface 632 includes logic separate from processor 610 to perform at least some processing related to the display. In some embodiments, display subsystem 630 includes a touch screen (or touch pad) device that provides both output and input to a user.

I/O controller 640 may include hardware devices and software components related to interaction with a user. I/O controller 640 may be operable to manage hardware that is part of audio subsystem 620 and/or display subsystem 630. Additionally, I/O controller 640 may be a connection point for additional devices that connect to computing device 600, through which a user might interact with the system. For example, devices that can be attached to computing device 600 might include microphone devices, speaker or stereo systems, video systems or other display devices, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of computing device 600. Additionally, audio output can be provided instead of, or in addition to, display output. In another example, if display subsystem 630 includes a touch screen, the display device may also act as an input device, which can be at least partially managed by I/O controller 640. There can also be additional buttons or switches on computing device 600 to provide I/O functions managed by I/O controller 640.

In some embodiments, I/O controller 640 manages devices such as accelerometers, cameras, light sensors or other environmental sensors, or other hardware that can be included in computing device 600. The input can be part of direct user interaction, and may provide environmental input to the system to influence its operations (such as filtering for noise, adjusting displays for brightness detection, applying a flash for a camera, or other features).

Power management component 650 may include hardware components (e.g., power management devices and/or circuitry) and software components (e.g., drivers and/or firmware) associated with managing battery power usage, battery charging, and features related to power saving operation.

Memory subsystem 660 may include one or more memory devices for storing information in computing device 600. Memory subsystem 660 can include nonvolatile memory devices (whose state does not change if power to the memory device is interrupted) and/or volatile memory devices (whose state is indeterminate if power to the memory device is interrupted). Memory subsystem 660 can store application data, user data, music, photos, documents, or other data, as well as system data (whether long-term or temporary) related to the execution of the applications and functions of computing device 600.

Some portion of memory subsystem 660 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 670 may include a network interface, such as a cellular interface 672 or a wireless interface 674 (so that an embodiment of computing device 600 may be incorporated into a wireless device such as a cellular phone or a personal digital assistant). In some embodiments, connectivity component 670 includes hardware devices (e.g., wireless and/or wired connectors and communication hardware) and software components (e.g., drivers and/or protocol stacks) to enable computing device 600 to communicate with external devices. Computing device 600 could include separate devices, such as other computing devices, wireless access points or base stations, as well as peripherals such as headsets, printers, or other devices.

In some embodiments, connectivity component 670 can include multiple different types of network interfaces, such as one or more wireless interfaces for allowing processor 610 to communicate with another device. To generalize, computing device 600 is illustrated with cellular interface 672 and wireless interface 674. Cellular interface 672 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 674 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 680 may include hardware interfaces and connectors, as well as software components (e.g., drivers and/or protocol stacks) to make peripheral connections. It will be understood that computing device 600 could both be a peripheral device to other computing devices (via "to" 682), as well as have peripheral devices connected to it (via "from" 684). The computing device 600 may have a "docking" connector to connect to other computing devices for purposes such as managing content on computing device 600 (e.g., downloading and/or uploading, changing, synchronizing). Additionally, a docking connector can allow computing device 600 to connect to certain peripherals that allow computing device 600 to control content output, for example, to audiovisual or other systems.

In addition to a proprietary docking connector or other proprietary connection hardware, computing device 600 can make peripheral connections 680 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A platform controller hub (PCH) comprising:
a direct media interface (DMI) interface to communicatively couple with a processor;
an enhanced serial peripheral interface (eSPI) interface to couple with an embedded controller (EC), wherein the eSPI interface is to transfer a second stream of data traffic related to the audio playback from the PCH to the EC, and a third stream of data traffic related to the audio playback from the EC to the PCH;
a host controller interface to communicatively couple with an audio device, wherein the host controller interface is to transfer a fourth stream of data traffic related to the audio playback; and
an interconnection fabric coupled to the DMI interface, the eSPI interface, and the host controller interface, wherein the EC is to process the second stream of data traffic to generate the third stream of data traffic, and wherein the fourth stream of data traffic is based on the third stream of data traffic.

2. The PCH of claim 1,
wherein the second stream is based on an input stream received from the processor.

3. The PCH of claim 2,
wherein a Service Interval (SI) of the second data stream is substantially the same as an SI of the input stream received from the processor.

4. The PCH of claim 1, wherein the first interface is configured to provide a direct path from the processor to offload selected end points to the EC.

5. The PCH of claim 1, wherein the interconnection fabric is within a system-on-chip transport.

6. The PCH of claim 1, wherein the host controller interface corresponds to a universal serial bus (USB) interface.

7. The PCH of claim 1, wherein the DMI interface, the eSPI interface, and the host controller interface are bidirectional interfaces.

8. The PCH of claim 1, wherein the EC is to process the second stream of data traffic without involvement of the processor.

9. The PCH of claim 1, wherein the processor is to remain in a C10 state while the EC processes the second stream of data traffic.

10. The PCH of claim 1, wherein the host controller interface is an extensible host controller interface (xHCI) interface.

11. An electronic device comprising:
a processor; and
a platform controller hub (PCH) communicatively coupled with the processor, wherein the PCH comprises:
a direct media interface (DMI) interface to communicatively couple with the processor;
an enhanced serial peripheral interface (eSPI) interface to couple with an embedded controller (EC), wherein the eSPI interface is to transfer a second stream of data traffic related to the audio playback from the PCH to the EC, and a third stream of data traffic related to the audio playback from the EC to the PCH;
a host controller interface to communicatively couple with an audio device, wherein the host controller interface is to transfer a fourth stream of data traffic related to the audio playback; and
an interconnection fabric coupled to the DMI interface, the eSPI interface, and the host controller interface, wherein the EC is to process the second stream of data traffic to generate the third stream of data traffic, and wherein the fourth stream of data traffic is based on the third stream of data traffic.

12. The electronic device of claim 11,
wherein the second stream is based on an input stream received from the processor.

13. The electronic device of claim 12,
wherein a Service Interval (SI) of the second data stream is substantially the same as an SI of the input stream received from the processor.

14. The electronic device of claim 11, wherein the first interface is configured to provide a direct path from the processor to offload selected end points to the EC.

15. The electronic device of claim 11, wherein the interconnection fabric is within a system-on-chip transport.

16. The electronic device of claim 11, wherein the host controller interface corresponds to a universal serial bus (USB) interface.

17. The electronic device of claim 11, wherein the DMI interface, the eSPI interface, and the host controller interface are bidirectional interfaces.

18. The electronic device of claim 11, wherein the EC is to process the second stream of data traffic without involvement of the processor.

19. The electronic device of claim 11, wherein the processor is to remain in a C10 state while the EC processes the second stream of data traffic.

20. The electronic device of claim 11, wherein the host controller interface is an extensible host controller interface (xHCI) interface.

* * * * *